Patented Oct. 6, 1931

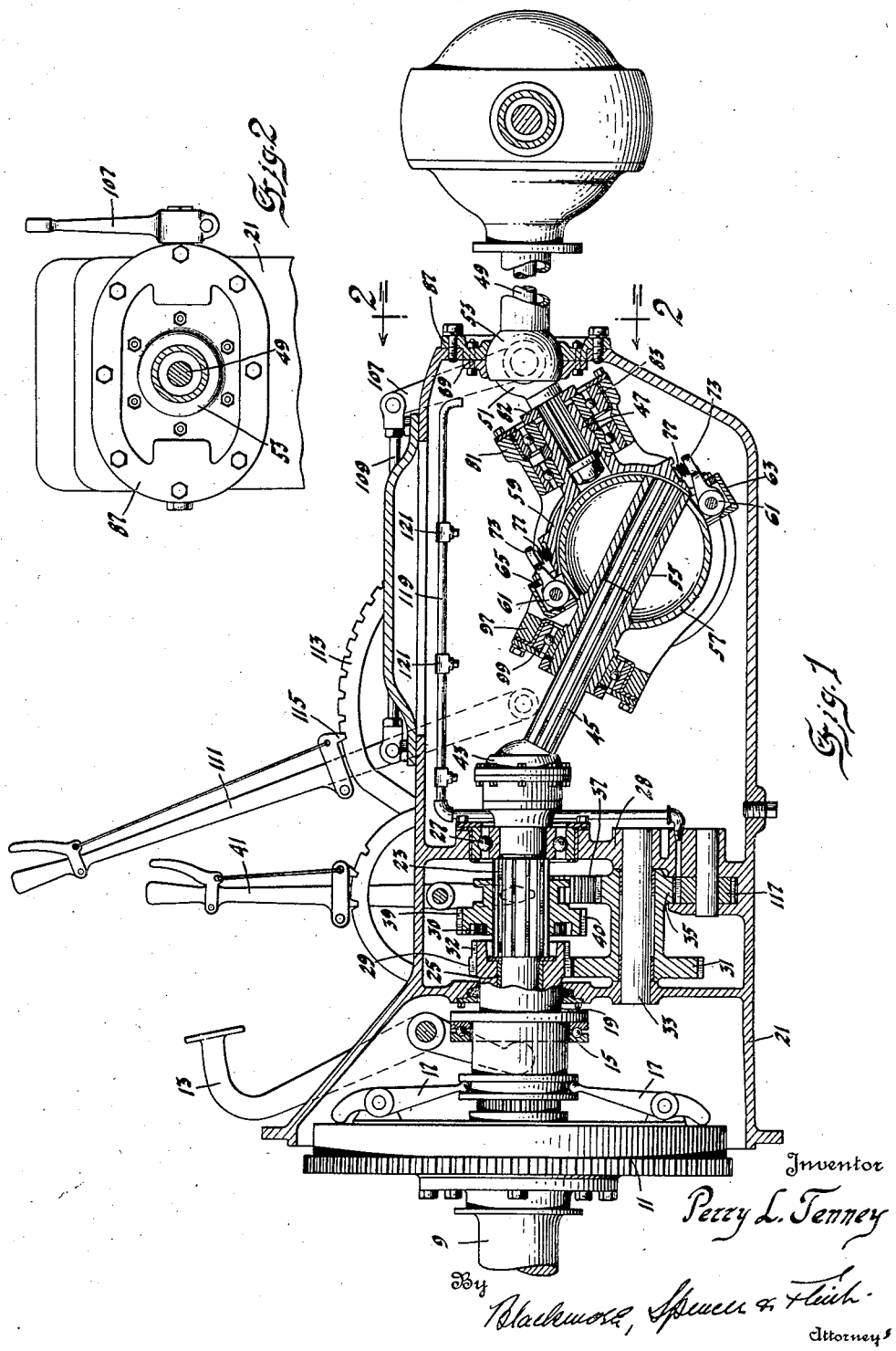

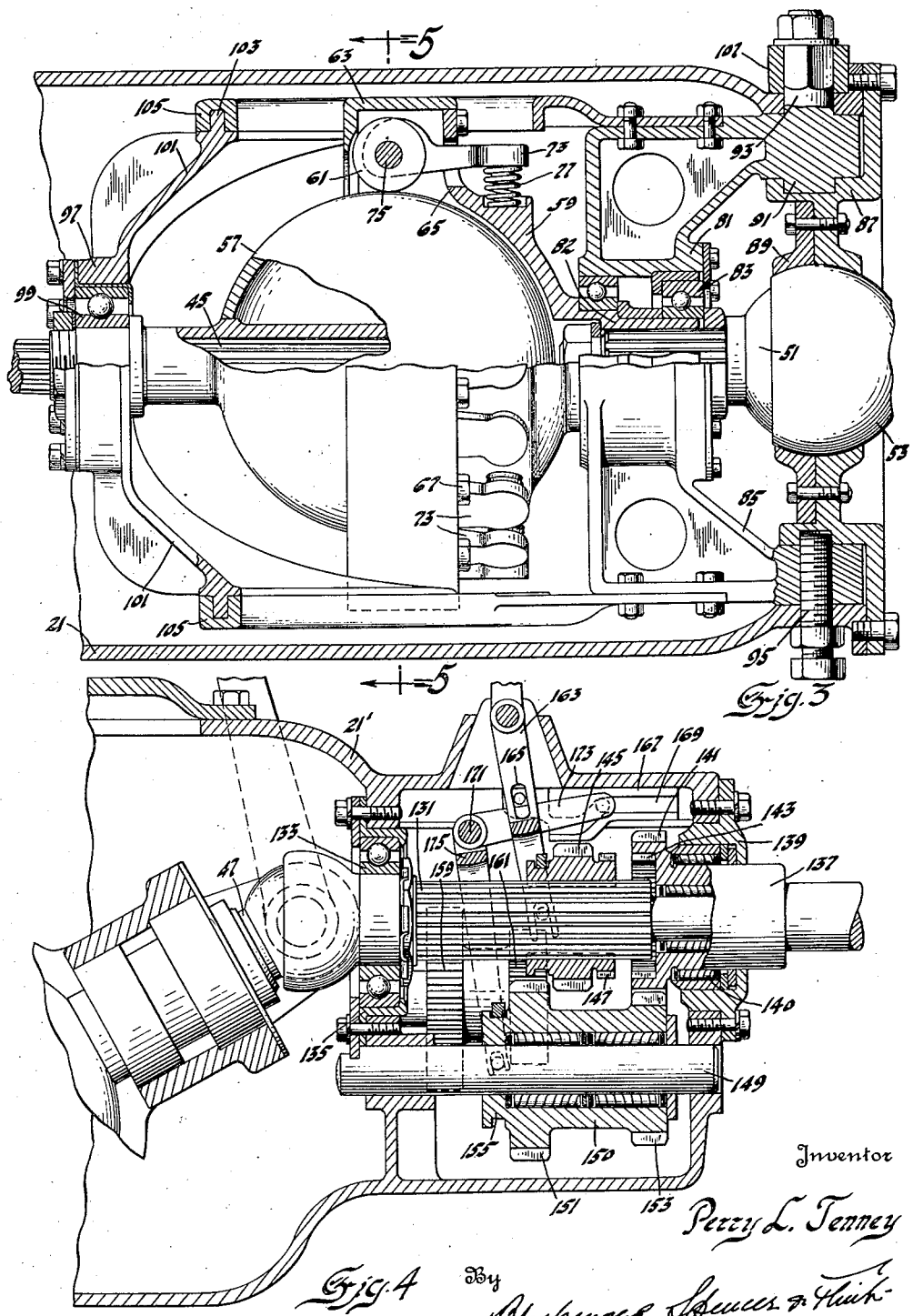

1,826,408

UNITED STATES PATENT OFFICE

PERRY L. TENNEY, OF MUNCIE, INDIANA, ASSIGNOR TO GENERAL MOTORS CORPORATION, OF DETROIT, MICHIGAN, A CORPORATION OF DELAWARE

VARIABLE SPEED TRANSMISSION

Application filed February 9, 1929. Serial No. 338,719.

This invention relates to power transmissions, and has been designed to provide a variable speed transmission intended particularly for motor vehicles.

An object of the invention is to provide a variable speed transmission wherein shifting is free from noise, and the normal shifting of gears and clutches is avoided.

As a further object, the invention aims to provide a plurality of speed ratios requiring for said changing ratios the mere change in the angularity of the axes of two shafts, and mounted parts, in driving engagement one with the other.

As another and associated object, the invention aims to provide for a reverse or other ratio drive and the neutral position by the association with the variable speed transmission of a clutch and emergency or auxiliary gearing.

As a further object, the invention aims to provide a constant driving contact of the variable speed ratio elements and thus prevent sudden gripping strains or the likelihood of initial slipping and scoring of the related parts.

Other objects and advantages will be apparent from the following description. Among such objects are comparative simplicity and high efficiency.

In the drawings:

Figure 1 is a vertical longitudinal section through a construction embodying the invention;

Figure 2 is a section on line 2—2 of Figure 1, showing the rear end cover of the transmission case;

Figure 3 is an enlarged horizontal sectional view through a part of the transmission shown by Figure 1;

Figure 4 is a vertical section of a modification;

Figure 5:
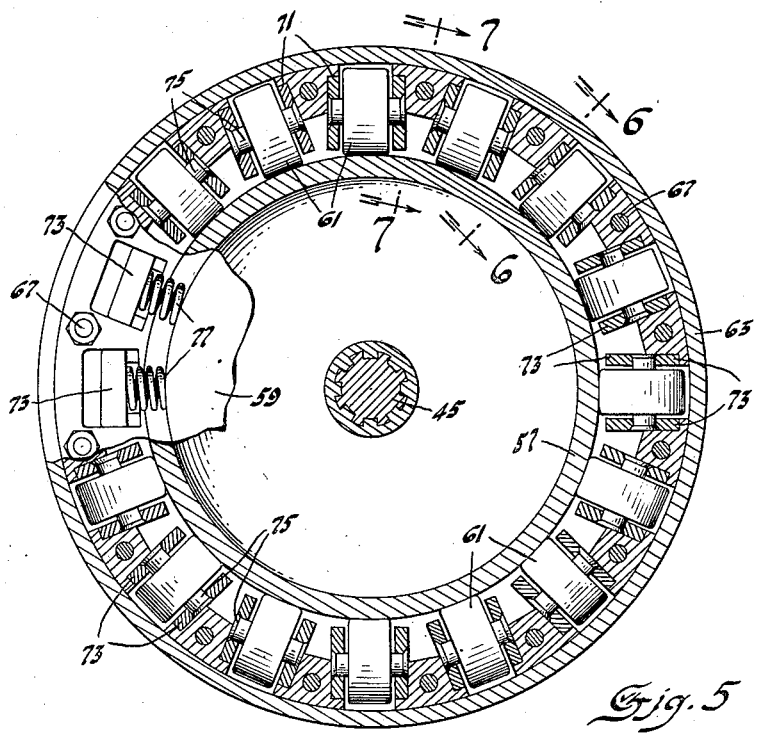
Figure 5 is a transverse section on line 5—5 of Figure 3.

Referring by reference characters to the drawings, numeral 9 represents a shaft which may be the crankshaft of the engine of a motor vehicle. 11 represents the flywheel associated with said shaft. A clutch is, as usual, associated with the flywheel. Its release is effected by a pedal 13 operable through a throw-out bearing 15 and levers 17. At 19 is a shaft driven by the clutch. It enters a gear housing which may be formed, if desired, as an integral part of the clutch housing 21. Within the gear housing a spline shaft 23 is journalled, there being a pilot bearing 25 within the rearmost end of the shaft 19, and a bearing 27 in the casing wall 28. The shaft 19 ends in a pinion 29 which drives a gear 31 rotatable about shaft 33. Spaced from gear 31 and integral therewith is a gear 35 which drives a reverse idler 37. Shaft 23 carries a slidable clutch gear member 39, having internal clutch teeth 30 to engage external gear teeth 32 on the extreme end of shaft 19. This element 39 also has gear teeth 40 to at times engage the reverse idler 37. A lever 41 operates in the usual way to slide gear member 39 to effect either a direct clutch engagement between shafts 19 and 23, or to effect the driving of 23 from 19 in a reverse direction through the gear elements 29 and 31, and 35, 37 and 40. While this gearshift provides only for direct drive and reverse in a well-known way, it may be explained that, if it should be found desirable, it may be modified as hereinafter described to provide other forward drives in addition to the direct drive effected by the clutch.

The driven shaft 23 extends through the bearing 27, as explained above, beyond which it is coupled by any conventional form of universal joint 43 to a spline shaft 45. This shaft 45, through the medium of the variable speed transmission unit as hereinafter described, drives a shaft 47, which latter is universally jointed to a propeller shaft 49, the joint including a ball member 51 within a socket 53 at the rear end of the housing 21.

The variable speed transmission above referred to includes a sleeve 55 formed rigidly with a hollow spherical ball 57. The sleeve 55 is slidable on spline shaft 45. Surrounding the ball 57 is a roller carrier 59 having a hollow stem surrounding and keyed to shaft 47. This carrier 59 is substantially semi-spherical and has at its edge provision for supporting a series of rollers 61 which engage the surface of the ball 57. These rollers are designed to frictionally grip the surface of the ball and, also, to have a rolling motion on said surface in a direction substantially at right angles to their direction of grip.

Figure 6:
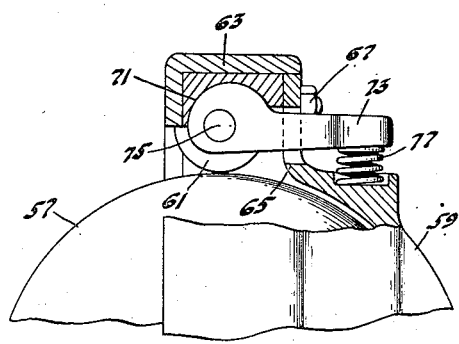
Figure 6 is a section on line 6—6 of Figure 5.
Figure 7:
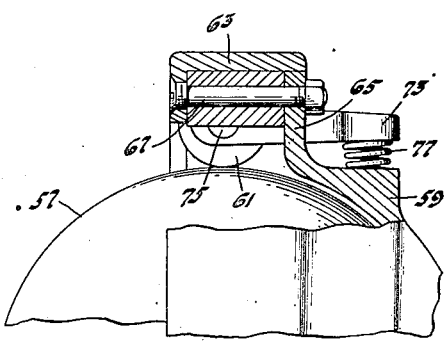
Figure 7 is a section on line 7—7 of Figure 5.
Figure 9:
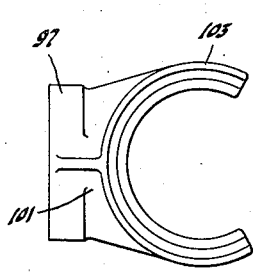
Figure 9 is a side view of another detail.
Figure 8:
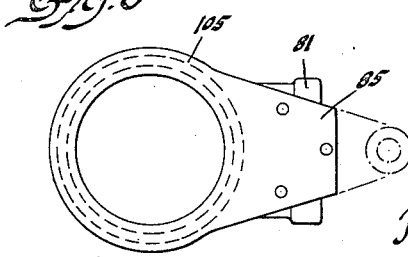
Figure 8 is a side view of a detail.

For supporting the rollers, a ring member 63, angular in cross section, is associated with a flange 65 of the carrier 59, as shown by Figures 6 and 7. Bolts 67 secure these parts together and also hold assembled therewith spaced abutment members having at their opposite sides shoulders 71, as shown in Figure 5. Levers 73 are forked, the forked ends engaging the rounded shoulders 71 which serve as fulcrums for the levers. The levers are provided at their forked ends with pivot pins 75, upon which are mounted between the forks of the levers the rollers 61. It will be seen from Figure 6 that the roller pivot is removed from the axis of rotation of the lever so that pressure is delivered by the roller upon the ball member. Outside the flange 65, springs 77 engage the levers to hold the rollers in contact with the spherical surface of the ball. It is the purpose of these rollers to circumferentially grip the spherical surface and to transmit to a variable degree the rotary motion of the ball to the carrier 59. The rollers are mounted to roll along the spherical surface of the ball in a direction substantially at right angles to the direction of grip, which direction of grip is along a line substantially parallel to the tangent, determined by the engagement between the rollers and the spherical surface and in the plane defined by the circular series of rollers. When shafts 45 and 47 are in alignment, the rollers 61 define a circle in a vertical plane which is substantially at right angles to the common axes of shafts 45 and 47. As shaft 45 is rotated, the ball member 57 then rotates the carrier 59, through the gripping engagement of the rollers upon the surface of the ball. Such driving is accompanied by no rolling of the rollers along the surface of the ball. Such driving rotates shaft 47 at the same rate as shaft 45, the driving being therefore at direct or high speed. To secure a drive of shaft 47 at rates less than that of shaft 45, the two shafts are caused to assume an angle with each other so that the circle defined by the rollers, which is always at right angles to the longitudinal axis of shaft 47, is no longer at right angles to the axis of shaft 45. Upon rotation of shaft 45, the gripping of the rollers on the ball serves, as before, to rotate the carrier, but the gripping and driving action is associated with a rolling of the rollers along the surface of the ball in a direction substantially at right angles to the direction of driving. The extent of this rolling is dependent upon the extent of angular relation between the shafts, and is a measure of the speed reduction between the shafts 45 and 47.

If the shafts are in the position shown by Figure 1, then one roller, the upper left of the circle shown in the figure, lies near the axis of shaft 45, and another, the lower right of the circle also lies near the axis of said shaft 45. If, now, the shaft 45 be turning, it will be evident that the point on the ball 57 originally engaged by the upper left roller describes a small circle in a plane at right angles to the axis of shaft 45. Since the axis of shaft 47 is fixed, any rotation of this shaft with the carrier 59 must be associated with a movement of the aforesaid upper left roller in the fixed circle of rollers. Therefore, if the ball drives the carrier through the rollers, the roller travelling in the fixed circle of rollers must constantly change its point of contact with the ball and travel along the surface of the ball in a reverse curve path from the point occupied by the upper left roller to a point on the circle represented by the aforesaid lower right roller, whereupon it returns by a similar curved path to a point on the circle represented by the first small circle mentioned above. It will therefore be seen that for all angular positions of shafts 45 and 47 the driving action of each roller is accompanied by a rolling motion of the roller along the surface of the ball which does not impart driving action. As a result of the rolling action, a lesser rotation is imparted to shaft 47 than the rotation of shaft 45.

The ratio of rotation between the ball 57 and carrier 59 is determined by the amount that the return point of the roller recedes from its starting point on the said small circle.

To effect the angularity of the shafts 45 and 47, the following arrangements are made. A ring 81 surrounds the hollow stem 82 of the carrier 59, there being a suitable antifriction bearing 83 between the ring 81 and the hollow stem 82. This permits free rotation of the hollow stem with shaft 47 within the ring 81. This ring 81 is formed with a pair of arms 85, constituting a yoke extending substantially horizontally, and pivotally mounted in a horizontal line by pivotal connections with the rear wall of the housing, one of such pivot connections being on either side of the ball joint 51. The rear closure member 53 may include separable parts 87 and 89. Trunnion pins 91 and 93 may be formed on one of the arms 85, whereby a pivotal connection is afforded between that arm and the parts 87 and 89 forming the wall of the casing. The other arm may be pivoted by a pivot pin 95 extended through the casing wall, the arm 85 and entering the housing closure. Surrounding shaft 45 is a ring 97, there being ball bearings 99 between the ring 97 and the shaft to permit free rotation of the latter. From ring 97 there extend arms 101. The arms extend horizontally and terminate in vertically disposed hollow trunnions 103, which are interlocked with similar vertically disposed hollow trunnions 105 extended from the ring 81. By this interlocking arrangement the rotation of ring 81, with its arm 85 constituting the yoke, about its pivot in the rear wall in the casing, may be effected. Such rotation in an obvious manner varies the angular relation between the shafts 45 and 47 while maintaining the center of the ball 57 coincident with the axis of the roller circle of the carrier 59. The variation may be made from a position in which the shafts are in alignment to a position as shown in Figure 1, in which the driving ratio between the shafts 45 and 47 is suitable for a low speed drive in motor vehicles. For the purpose of so swinging the yoke, an arm 107 may fit on a non-circular extension of trunnion 93. This lever arm 107 may be connected by a link 109 to any suitable operating means, for example, a lever as 111, the position of which may be determined by a rack 113, and a locking dog 115, as usual. The plurality of lever positions determined by parts 113 and 115 obviously determine a plurality of angular relations between shafts 45 and 47, and thereby determine the speed ratio between said shafts.

To provide lubrication for the movable parts of the variable speed transmission, there may be used a gear 117 in mesh with one of the gears of the gear unit, for example, gear 35, to thereby constitute an oil pump. The lubricant so pumped is distributed by a pipe 119 with outlets 121. This arrangement is adopted since the uppermost part of the variable speed transmission constituted by the ball and roller carrier may best be lubricated from above.

The construction for reduced speed ratios makes possible the adoption of a considerable number of such ratios between direct and the lower limit determined by the engagement of the roller carrier and sleeve 55 as shown by Figure 1.

The ball and socket transmission unit is not complicated by any provision for affording neutral or reverse. It is believed that it is better to use, together with the simple arrangement described, a substantially conventional forward and reverse gearshift mechanism and a clutch. The operating mechanism for the sliding gear unit and for the novel variable speed unit may be distinct, as shown in the drawings, or, if desired, one operating mechanism may be arranged to control both. No single operating mechanism for controlling both transmission units is herein shown, since such a unitary control is not a part of this invention.

It will be understood that the position of the sliding gear unit and the variable speed unit may be reversed, if desired. Such a reversal is shown in Figure 4. As will be understood from this figure, the variable speed transmission unit is directly associated with the clutch driven shaft. The shaft 47 is jointed, not to the propeller shaft as in Figure 1, but to a spline shaft 131 within a transmission casing which may be separable from, or an integral part of casing 21'. Shaft 131 is journalled by antifriction means 133 in a casing wall 135, and at its other end is piloted with roller bearings 140 in an opening in a driven shaft 137. This shaft 137 is rotatably mounted in the rear wall 139. The inner end of shaft 137 has external gear teeth 141 and internal clutch teeth 143. Slidable and non-rotatable on spline shaft 131 is a slidable gear 145, which gear is also provided with clutch teeth 147 to at times engage clutch teeth 143. Such engagement affords a direct drive between shaft 47 and shaft 137. The casing carries a countershaft 149 rotatably and slidably supporting a double gear ring 150 equipped with gear members 151 and 153. This ring 150 is provided with a collar 155 whereby the ring may be reciprocated on its shaft. In one position of the gear ring gear teeth 153 are in mesh with gear teeth 141, as shown. A reverse idler is illustrated as having united gear members 159 and 161, the latter being in mesh with gear teeth 151 in the position of gear ring 150, shown by Figure 4.

The gear shifting is accomplished by a lever 163, the movements of which, in a fore and aft direction, effect a progressive shift from direct, through a neutral position, into low speed and finally into reverse. The lever has a suitable forked connection with the collar of gear 145. The lever also has a pin and slot connection as at 165 with a shift rail 167. This rail has a cam slot 169. A fixed pivot 171 rotatably supports a two-arm lever, one arm of which, 173, carries a pin travelling in the cam slot 169, and the other arm of which, 175, is forked and engages collar 155 of the gear ring 150.

The drawings illustrate the parts in neutral position. If lever 163 is rocked in a counter-clockwise direction, gear 145 is moved to the right so that its teeth 147 are clutched with teeth 143. The drive is then direct through this gear shift transmission unit. At the same time that gear 145 is being moved to the right, the movement of rail 167, also to the right, causes the lever arm 173 to swing clockwise about its pivot 171, this movement being effected by the cam slot and the pin on lever arm 173. As a result of this movement, gear ring 150 is moved to the left, and its teeth 151 and 153 are separated from engagement with gears 161 and 141 respectively. It will, therefore, be seen that when the transmission is in direct, there is no rotating movement of the countershaft gear member 150, nor of the reverse idler.

The lever 163 may then be shifted in a reverse direction back to the neutral position shown by Figure 4. In so moving the lever, not only is the clutch connection between teeth 147 and 143 broken, but the gear ring 150 is moved so that its teeth are brought into active engagement, the one with gear member 141 and the other with one of the reverse idler gears 161. A further movement of the lever 163 brings gear 145 into mesh with gear 151. There is then a drive from the spline shaft through gears 145, 151, 153 and 141 whereby a reduction drive is effected through this transmission unit. A further progressive movement of lever 163 moves gear 145 out of mesh with gear 151 and into mesh with gear 159, constituting a part of the reverse idler. The drive is then from spline shaft 131 through gears 145, 159, 161, 151, 153 and 141 to the driven shaft 137. It will be seen from the drawings that the movements of the lever toward the left from its neutral position do not change the position of gear ring 150 owing to the presence of the straight portion of the cam slot on the shift rail.

It will be understood that shaft 137 is to be coupled by a universal joint, not shown, with the propeller shaft, as usual.

This modified form, wherein the transmission is provided with a low speed ratio in addition to a direct clutch, and wherein the transmission unit is located to the rear of instead of in front of the variable speed unit, may be found desirable in those cases where lower ratio is needed than is afforded by the variable speed unit. In such cases it may be found better to locate the gear shift unit to the rear of the variable speed unit rather than to enlarge and strengthen the parts of the variable speed unit to withstand the greater loads under which it would have to operate, if used to the rear of the gear shift unit, as in Figure 1. The relative positions of these units is to be considered as a matter of expediency.

Either arrangement may be used, as seems best in any installation.

I claim:

1. In combination, a driving shaft, a driven shaft, means to simultaneously change the axial direction of both shafts to thereby vary the angular relation between said shafts, mechanism coupling the adjacent ends of said shafts, said mechanism including a spherical member carried by one of said shafts and gripping members engaging said spherical member and carried by the other of said shafts whereby when in alignment a direct drive is transmitted, and whereby when angularly disposed a ratio drive is transmitted.

2. In combination, a driving shaft, a driven shaft, means to simultaneously change the axial direction of both shafts to thereby vary the angular relation of said shafts, a member having a spherical surface carried by one of said shafts at their adjacent ends, combined gripping and rolling members carried by said other shaft and engaging the surface of said member to grip and drive in one direction of motion and to roll in another direction of motion.

3. The invention defined by claim 1, the means for varying the angular shaft relation comprising rings coaxially surrounding said shafts and having parts interlocking, relatively rotatable and arranged diametrically of said spherical surface, a fixed pivot support for one of said rings and means to rotate said ring about its support.

4. In combination, a driving shaft, a driven shaft, means to simultaneously change the longitudinal axes of both said shafts to and from alignment, a member having a spherical surface carried by one of said shafts at their adjacent ends, a member carried by the adjacent end of the other shaft encompassing said spherical surface, a plurality of gripping and rolling means carried by said second mentioned member and positioned substantially in a circle around said spherical surface.

5. The invention defined by claim 4, together with resilient means operable to hold said gripping and rolling means upon said spherical surface.

6. In combination, a first shaft, a driving shaft, a universal joint coupling said first shaft and driving shaft, a driven shaft, a propeller shaft, a universal joint coupling said driven shaft and said propeller shaft, said first shaft and propeller shaft being in alignment, a member mounted telescopically on one of said driving and driven shafts, said member having a spherical surface, a member rigidly secured to the other of said driving and driven shafts, said last-named member having a plurality of gripping and rolling members in contact with said spherical surface along a circle on said spherical surface, and means to move said driving and driven shafts to and from alignment.

7. The invention set forth in claim 6, said last-named means comprising a ring on each of said driving and driven shafts, said rings being hinged together diametrically of said spherical member, means to pivotally support one of said rings, and manually operable means to rotate said pivoted ring and change the angular relation of the shafts.

8. In combination, a shaft, a ball non-rotatable relatively thereto, another shaft, means to simultaneously change the axes of both shafts to thereby selectively predetermine an angular relation between said shafts, means non-rotatable relative thereto said other shaft, gripping and rolling means carried thereby and arranged substantially in a circle about said ball and contacting therewith whereby the driving shaft may drive the driven shaft at reduced speeds dependent upon the angular relation of said shafts.

9. The invention defined by claim 8, said circle defined by said gripping and rolling means being substantially a great circle of said ball.

10. In combination, a driven shaft, a driving shaft, means to simultaneously change the longitudinal axes of both shafts, one of said shafts having rotatable therewith a first member with a spherical surface, the other shaft having rotatable therewith a second member in driving engagement with the member having the spherical surface, a circular series of gripping and rolling members carried by said second member and engaging said surface, said rollers mounted for rotation on axial pins, the longitudinal axes of the pins being in the plane of the circle of rollers and substantially parallel to the tangent at the point of contact between the rollers and said surface.

11. The invention defined by claim 10 together with levers fulcrumed on said second member, said axial pins carried by said levers, and yielding means operable on said levers to hold said rollers in engagement with said spherical surface.

In testimony whereof I affix my signature.

PERRY L. TENNEY.